Patented Sept. 19, 1939

2,173,535

UNITED STATES PATENT OFFICE 2,173,535

STEEL MAKING

Charles B. Francis, Pittsburgh, Pa.

No Drawing. Application January 3, 1939, Serial No. 249,157

5 Claims. (Cl. 75—25)

This invention relates to a process for steelmaking, particularly to a process of making steel by the basic open-hearth and basic electric furnace, and has for its objects the utilization of fine dust recovered from blast furnaces making manganese alloys and other steel works wastes or byproducts, in the making of steel to control the physical and chemical properties of the slag and assist in desulphurizing the steel; and following the use of the dust in this way, the complete recovery of the manganese.

It is a characteristic of blast furnaces making manganese alloys, particularly ferromanganese, to produce an unusually large proportion of extremely fine dust which escapes from the furnace with the furnace gases. This dust is separated from the gases with difficulty and is prepared for use only by special methods, the material not being amenable to treatment by the usual processes of sintering and nodulizing. However, the dust possesses certain cementing properties which are taken advantage of to prepare mixtures suitable for use in the basic open-hearth or the basic electric furnace and less suitable for charging back into the blast furnace, since the treated material has a tendency at elevated temperatures of about 1500° Fahrenheit to crumble.

This dust, which, as collected from the gases from the blast furnace, varies somewhat according to the charge and the particular product being made, has an average composition approximately as follows:

| Bases | Percent | Acids | Percent |
|---|---|---|---|
| Manganous oxide, MnO | 20.0 | Silica, $SiO_2$ | 10.0 |
| Ferrous oxide, FeO | 0.5 | Phosphorus pentoxide, $P_2O_5$ | 0.4 |
| Alumina, $Al_2O_3$ | 9.0 | | |
| Calcium oxide, CaO | 12.0 | Sulphur trioxide, $SO_3$ | 2.0 |
| Magnesia, MgO | 5.0 | Sulphur dioxide, $SO_2$ | 4.0 |
| Potassium oxide, $K_2O$ | 12.0 | Carbon, C | 6.0 |
| Sodium oxide, $Na_2O$ | 4.0 | Chlorine, Cl, and other acid radicals | 2.0 |
| Barium oxide, BaO | 0.6 | | |
| Zinc oxide, ZnO | 0.3 | Water, $H_2O$, and carbon dioxide, $CO_2$ | 12.0 |

As obtained from the blast furnace, this material is so finely divided that if it is recharged to the blast furnace, it is immediately blown out again, and even when charged into the open hearth, it is carried out of the furnace by the draft. It is extremely difficult to handle except in packages, because it is picked up by the air through natural drafts, such as breezes and winds. It is, therefore, necessary to subject this material to special preparation before it can be utilized.

In the preparation of this dust for recharging into the furnace, the fine dust is mixed with an aggregate material and moistened with water or a chemical solution to develop its setting properties. Afterwards, it is compressed and permitted to dry and cure to a hard mass.

As an aggregate for use in the present invention, I use a suitable form of iron-manganese oxide, preferably in a form similar to that known as roll scale. This material is obtained in flake form and is fairly hard, properties which make it a good material to be used as an aggregate. While other hard iron oxide bearing materials may be used, such as crushed basic heating furnace cinder and crushed open-hearth slag, I prefer to use roll scale if it is available, because it bonds well with the cement-like dust and, except for one to two per cent of manganese oxide and various impurities, is an almost pure iron oxide corresponding closely to the formula $Fe_3O_4$. For the same reason, it is the simplest type of aggregate for a dust mixture to serve as an example in illustrating and explaining the principles and reactions of the process of my invention.

Starting with a dust having an average composition approximately the same as that previously given above, I mix the dust and roll scale in approximately equal proportions by weight. After this mixture has been moistened, mixed, compressed, dried, and allowed to cure or set to a hard mass, the product has a composition approximately as represented by the following analysis:

| | Percent | | Percent |
|---|---|---|---|
| Iron oxide as FeO | 45 | Silicon dioxide, $SiO_2$ | 5 |
| Manganese oxide as MnO | 10 | Alumina, $Al_2O_3$ | 4 |
| Calcium oxide, CaO | 6 | Sulphur trioxide, $SO_3$ | 1 |
| Magnesium oxide, MgO | 2 | Sulphur dioxide, $SO_2$ | 2 |
| Sodium oxide, $Na_2O$ | 2 | Miscellaneous oxides | 1 |
| Potassium oxide, $K_2O$ | 6 | Carbon, C | 3 |
| | | Water and carbon dioxide | 13 |

On being heated to high temperatures such as prevail in steel-making furnaces, the water and carbon dioxide are driven off and the per cent of the other components in the ignited material is increased proportionately. The mixture should have a fusion point below 2600° Fahrenheit, and to assure such a low fusion temperature, I keep the sum of the silica, alumina, and other acids equal to or less than the sum of the calcium, sodium, and potassium oxides, and the iron oxide, calculated to FeO, at least three times the manganese, calculated to MnO. These proportions serve as a guide when it is necessary to mix other materials other than roll scale with the dust.

After this mixture has been treated to give it the form of hard compact masses, it is in condition to be utilized in basic furnaces for the making of steel by the process of my invention, which is carried out in basic open-hearth furnaces as follows.

With the furnace heated as in regular operations, I charge the dust mixture upon the bottom of the furnace in an amount proportional to the total silicon in the total charge of pig iron and scrap to be charged later as closely as can be estimated. For example, if the charge is made up of 100,000 pounds of scrap containing .2 per cent silicon, the total silicon in the scrap would be 200 pounds; and if the rest of the charge is made up of pig iron containing 1.25 per cent silicon, the silicon would be 1250 pounds; or a total of 1450 pounds of silicon in the charge which is equivalent to approximately 3100 pounds of silica, $SiO_2$. Since it is desired that total silica in the resultant slag will not exceed 15 per cent, the amount of the dust mixture charged for such a heat will be approximately twenty times the total silicon the charge contains.

After the scrap has been charged, it is heated until some of it has melted and the pig iron is charged in solid or liquid form, according to usual practice.

In the example just given, for example, I would charge twenty times 1450 pounds, or a total of 29,000 pounds, of the dust mixture. This quantity of the dust is slightly more than the limestone and ore usually charged when making a heat of steel from raw materials used in the same proportions. For a heat made up of 100,000 pounds of scrap and 100,000 pounds of pig iron, the limestone would be approximately 17,000 pounds and the ore approximately 10,000 pounds, making a total of 27,000 pounds of fluxing and oxidizing material.

However, the action of the mixture of dust and scale or other suitable oxide is entirely different from the action of the mixture of limestone and ore, and constitutes one of the chief features of the process of the invention. With the latter materials, the limestone decomposes, beginning at about 1500° Fahrenheit, liberating carbon dioxide, and is followed by the action of the ore upon the liquid contents of the bath oxidizing mainly carbon in the charge. The elimination of silicon, manganese, phosphorus, carbon and sulphur follows as simple oxidation and fluxing reactions.

With the mixture of dust and scale, or other iron oxide, the first action of the heat of the furnace is to drive off the water and later a part of the carbon dioxide. As the material becomes heated to a temperature near its fusion point, the remainder of the carbon dioxide, which is relatively small in amount, is driven off, and the carbon it contains reacts with the iron-manganese oxides, reducing a portion to metallic iron and manganese. Therefore, I do not obtain rapid evolution of carbon dioxide as with limestone, but sufficient gases are evolved to cause some agitation of the bath. As the material reaches its fusion point, the reduced iron and manganese become a part of the metallic bath while the remaining oxides act like ore to oxidize carbon in the liquid bath.

The effect, therefore, is to momentarily increase the metallic manganese content of the charge, manganese being recognized as a desulphurizing agent. In addition to the manganese, however, I have the action of sodium and potassium components upon the metallic bath to further assist in the elimination of sulphur and the fluxing of the oxides of phosphorus. In regard to the alkalies, sodium and potassium appear to combine with the sulphur to be converted, possibly, to a sulphate. In any event, I have shown experimentally that sodium sulphate, for example, is completely decomposed at a temperature of approximately 1300° centigrade (2372° Fahrenheit) giving sulphur dioxide as one of the products which, being gaseous, is no sooner formed than it escapes from the bath with the other products of oxidation and combustion. Thus, through the action of the manganese and of the sodium compounds, the bath is continually being depleted of its sulphur. The action is more efficient for the purpose of sulphur elimination than the ordinary charge with limestone, because the presence of much lime results in the formation of calcium sulphate, which is relatively stable up to temperatures of 2800° Fahrenheit and even at that temperature it is decomposed somewhat slowly.

Another advantage in the use of the dust oxide mixture is that it forms a very fluid slag with the very acid and basic components in proportions to form eutectic mixtures having very low fusion points. With such fluid slag, the viscosity can be increased by adding lime as desired and decreased by adding more of the dust mixture. After some experience with its use, however, these adjusting additions become necessary and the dust mixture eliminates the necessity for the use of fluorspar to thin the slag.

A third advantage in the use of the mixture is that it increases the maganese content of the metal. This is due to the fact that the use of the mixture increases the manganese content of the slag, which content; for each set of conditions with respect to the temperature and the carbon content of the heat; is in equilibrium with the manganese content of the metal.

With a high proportion of pig iron in the charge, such as in the case of the present example, the slag will be tapped from the furnace as soon as the charge is all melted and part of the carbon has been oxidized. This runoff slag is found to contain consistently more than the usual amount of manganese found in runoff slag. Therefore, in my process I collect this slag in a ladle or other suitable receptacle and break it up, either by treatment by water while it is hot or by crushing it cold, when it may be charged into a blast furnace making either pig iron or a manganese alloy, for the recovery of practically all the manganese contained in the original dust mixture as well as in the pig iron and scrap of the charge.

In charges made up mainly of scrap with sufficient pig iron to increase the carbon content of the melt to a point suitable for beginning the working period, the original slag may be held in the furnace until the steel has been finished. In this practice, it will be desirable to add some additional lime to the slag as the temperature increases. The addition of lime increases the basicity of the slag and disturbs the equilibrium conditions between the slag and metal so that as long as carbon is present in the latter, it is found to contain a high percentage of manganese. With proper control of flame conditions and temperature, it is possible to make medium and high carbon steels retain manganese in the metal equivalent to .30 per cent to .50 per cent. Thus, certain types of steel can be made without the use of ferromanganese or other additions.

For low carbon steels which do not require the phosphorus to be eliminated to a very low point, it is feasible to drive manganese from the slag into the metal through the use of a little ferrosilicon or a reducing agent, such as coal. With little lime in the slag, reversion of the phosphorus readily takes place and it is necessary to adjust the lime content of the slag to develop a condition more favorable to the reduction of phosphorus by the slag. On certain heats to be finished with very little carbon, manganese, phosphorus, and silicon remaining, it is advisable to tap off practically all the old slag and add dry lime to give 60 per cent to 70 per cent lime in the slag, thus forming a lime-iron oxide eutectic melting at a low temperature.

With this dust-iron oxide mixture, the finishing slags from most heats will be higher than usual in both manganese and iron oxide and these are collected and reserved for blast furnace consumption, as described above for the runoff slags.

To utilize the dust-iron oxide mixture in the electric furnace, I add to the charge as much of the prepared dust mixture as desired and proceed with the melting in the usual manner. After the scrap charge has been melted, the dust mixture will be found as a slag at the surface of the steel. If it is desired to reduce the phosphorus, this slag will be tapped from the furnace, but if it is not desired to eliminate phosphorus, the slag may remain in the furnace during the reducing period, at which time coal or coke dust is added to the slag. Under these conditions, practically all the iron oxide and a large part of manganous oxide in the slag are reduced, and the resultant metals are recovered as a part of the metallic bath. If it is desired to eliminate the phosphorus, it is necessary to tap the slag from the furnace, and the iron and manganese may be recovered by charging the slag into the blast furnace as described for the open-hearth process above.

The aim of the foregoing description has been to make a specific disclosure as required by the patent statutes of this invention, and it is apparent that the process of the invention may be modified in various details without exceeding the scope of the invention as defined by the following claims.

For example, if the variations in the composition of the dust available for regular use, or the objectives of the steel-making process in which the mixture of this invention is to be used, should require an increase in the manganese content over that of the examples given above, I would use a substance in suitable physical condition, containing manganese in the desired greater proportion instead of or in addition to the roll scale cited herein as a preferred aggregate material.

I claim:

1. A process for reclaiming manganese from the finely divided manganese-bearing dust produced by blast furnaces making manganese alloys, which process includes separating the dust from the gas, mixing with it an iron oxide waste or by-product from the steel mills, treating the mixture to form compact solid masses, charging the material into basic steel-making furnaces, tapping the resultant slag from the furnace, and recharging the slag in the blast furnace.

2. A process for making steel in the basic open-hearth, which process includes charging into the furnace with the scrap and pig iron an artificially prepared mixture of iron and manganese oxides and manganese-bearing dust recovered from blast furnaces making manganese alloys, melting the charge, and finishing the steel in the usual manner.

3. A process for desulphurizing iron, steel and pig iron, which process includes mixing with the molten metal a quantity of a mixture of iron and manganese oxides and the dust produced by blast furnaces making manganese alloys.

4. A process for reclaiming the manganese from the dust produced by furnaces making manganese alloys, which process includes mixing the dust with oxides of iron and manganese, wetting, compressing, and drying the mixture, charging the dry mixture with scrap into an electric furnace, melting the charge, and adding to the slag formed a mixture of carbon and calcium oxide.

5. A process for reclaiming manganese from the finely divided manganese-bearing dust produced by blast furnaces making manganese alloys, which process includes separating the dust from the gas, mixing with it an aggregate material of compact particles composed chiefly of iron and manganese oxides, waste or by-products from the steel mills, treating the mixture to form compact solid masses, charging the material into basic steel-making furnaces, tapping the resultant slag from the furnace, and recharging the slag in the blast furnace.

CHARLES B. FRANCIS.